(12) United States Patent
Schnaitmann

(10) Patent No.: US 9,969,038 B2
(45) Date of Patent: May 15, 2018

(54) TOOL SPINDLE HAVING AN ACTIVE MAGNETIC BEARING

(71) Applicant: Mahle International GmbH, Stuttgart (DE)

(72) Inventor: Gottfried Schnaitmann, Backnang (DE)

(73) Assignee: Mahle International GmbH (DE)

( * ) Notice: Subject to any disclaimer, the term of this patent is extended or adjusted under 35 U.S.C. 154(b) by 53 days.

(21) Appl. No.: 15/023,400

(22) PCT Filed: Sep. 15, 2014

(86) PCT No.: PCT/EP2014/069602
§ 371 (c)(1),
(2) Date: Mar. 20, 2016

(87) PCT Pub. No.: WO2015/039985
PCT Pub. Date: Mar. 26, 2015

(65) Prior Publication Data
US 2016/0288283 A1    Oct. 6, 2016

(30) Foreign Application Priority Data

Sep. 20, 2013   (DE) ...................... 10 2013 218 888

(51) Int. Cl.
*B23Q 1/70* (2006.01)
*B23B 41/04* (2006.01)
(Continued)

(52) U.S. Cl.
CPC ............... *B23Q 1/70* (2013.01); *B23B 41/04* (2013.01); *B23B 41/12* (2013.01);
(Continued)

(58) Field of Classification Search
CPC   B23Q 1/70; B23B 41/04; B23B 41/12; F16C 32/0402; F16C 32/0474; F16C 32/06
See application file for complete search history.

(56) References Cited

U.S. PATENT DOCUMENTS 4,852,306 A * 8/1989 Harmand ................. B23Q 1/28
                                                    451/360
5,302,057 A * 4/1994 Siegfried ................ B23C 3/055
                                                    408/1 R
(Continued)

FOREIGN PATENT DOCUMENTS

CN      00103223509 A    7/2013
DE      3822615 A1       1/1990
(Continued)

OTHER PUBLICATIONS

English translation of SU 1016089, May 1983.*
(Continued)

*Primary Examiner* — Alan Snyder
(74) *Attorney, Agent, or Firm* — Fishman Stewart PLLC

(57) ABSTRACT

A tool spindle for a drilling tool may include a drive shaft for driving the drilling tool, a chuck connected rigidly to the drive shaft along a rotation axis directed longitudinally with respect to the drive shaft for receiving a clamping shank of the drilling tool, and at least one radial bearing radially enclosing at least a portion of the drive shaft for radially mounting the drive shaft, configured such that the radial bearing may mount the drive shaft to be rotatable about the rotation axis. The radial bearing may be an active magnetic bearing and may be configured such that it mounts the drive shaft to be pivotable about at least one pivot axis extending perpendicularly to the rotation axis through a fixed point, wherein the fixed point may be located in a centering countersink of the drilling tool when the drilling tool is clamped in the tool spindle.

17 Claims, 2 Drawing Sheets

(51) Int. Cl.
 *B23B 41/12* (2006.01)
 *F16C 32/04* (2006.01)
 *F16C 32/06* (2006.01)

(52) U.S. Cl.
 CPC ...... *F16C 32/0402* (2013.01); *F16C 32/0474* (2013.01); *F16C 32/06* (2013.01); *F16C 2322/39* (2013.01)

(56) References Cited

U.S. PATENT DOCUMENTS

| 5,782,585 | A | 7/1998 | Bathen | |
|---|---|---|---|---|
| 6,288,465 | B1 * | 9/2001 | Suzuki | F16C 32/00 219/648 |
| 6,352,394 | B1 * | 3/2002 | Lawson | B23B 31/08 279/16 |

FOREIGN PATENT DOCUMENTS

| DE | 3930629 | A1 * | 3/1991 | ......... B23K 37/0452 |
|---|---|---|---|---|
| DE | 4312937 | A1 | 10/1994 | |
| DE | 4442218 | A1 | 5/1996 | |
| DE | 19917134 | A1 | 10/2000 | |
| DE | 10137437 | A1 | 2/2003 | |
| DE | 10308442 | B3 | 7/2004 | |
| DE | 102005020501 | A1 | 11/2005 | |
| DE | 102006018267 | A1 | 11/2007 | |
| DE | 102006038924 | A1 | 2/2008 | |
| DE | 102006052038 | A1 | 5/2008 | |
| DE | 102008063945 | A1 | 6/2010 | |
| EP | 0364993 | A2 | 4/1990 | |
| GB | 2220155 | A | 1/1990 | |
| JP | 06039663 | A * | 2/1994 | |
| JP | 2006263847 | A * | 10/2006 | |
| SU | 1016089 | A1 * | 5/1983 | ........... B23Q 1/5462 |
| WO | WO-2006/105293 | A2 | 10/2006 | |
| WO | WO-2011005498 | A2 | 1/2011 | |

OTHER PUBLICATIONS

English abstract for DE102006018267.
English abstract for DE-102006038924.
Eglish abstract for DE-102006038924.
German Search Report for DE-102013218888.9, dated Aug. 6, 2014.
English abstract for DE-10308442.
English abstract for DE-102005020501.
English abstract for DE-19917134.
English abstract for DE-102006052038.
English abstract for DE-10137437.
The Research on Technology of Mechanical Expand Connection, Oct. 2010.
Chinese Office Action for CN-201480056063.7, dated May 3, 2017.

* cited by examiner

TOOL SPINDLE HAVING AN ACTIVE MAGNETIC BEARING

CROSS-REFERENCE TO RELATED APPLICATIONS

This application claims priority to German Patent Application No. 10 2013 218 888.9, filed Sep. 20, 2013, and International Patent Application No. PCT/EP2014/069602, filed Sep. 15, 2014, both of which are hereby incorporated by reference in their entirety.

TECHNICAL FIELD

The invention relates to a tool spindle and to a corresponding machine tool.

BACKGROUND

Machines for machining workpieces with tools are known in the field of mechanical engineering and tool making as what are referred to as machine tools. According to a narrower interpretation, this term is used primarily in the context of joining, shaping and separating production processes, in the last-mentioned case in particular cutting, machining and subtractive production processes within the meaning of the Standards DIN 8580 et seq. and DIN 69 651, Part 1. This more restrictive definition is now also used as the basis for the following statements.

With the aim of shaping the workpiece, a generic machine tool creates a relative movement between the tool and workpiece, this relative movement being able to be subdivided functionally into an advancing or infeed component and a main component. The most important structural component of modern machine tools is in this case a direct-drive, precisely mounted shaft having a usually integrated tool interface, these being familiar to a person skilled in the art as motor spindles.

Although said relative movement between the tool and workpiece can be brought about in principle by means of a rotation of either of the two elements, drilling, grinding and milling machines according to the prior art are usually equipped with tool-carrying motor spindles which are denoted tool spindles in the following text. DE 101 37 437 B4 describes for example a machining process based on such a drill spindle for bores such as the pin bore of a piston or the connecting-rod bore of a connecting rod, and in this context the pin bore or the connecting-rod bore is machined with a drill spindle of a machining device and the drill spindle is arranged in an offset manner with respect to the theoretic hole center of the bore during the machining operation, and the piston or the connecting rod executes a linear movement in the advancing direction during the machining operation.

Especially nonround bores, for example what are referred to as spherical bores, prove to be problematic here. A precision drilling machine intended to produce such bores is disclosed for instance in DE 44 42 218 A1. According to that proposal, the precision drilling machine is intended to be equipped with a drill bit on a drill spindle and with a holder for a workpiece to be machined in order to produce nonround bores for economical use at high rotational speeds. For this purpose, the holder for the workpiece oscillates in translational movement in at least one direction with a frequency determined by the particular rotational speed of the drill bit and on a deviation path determined by the bore shape to be produced.

DE 10 2008 063 945 A1 also relates to a process for forming nonround bore profiles and concentrates in this case on pin bores of pistons of an internal combustion engine, which are intended for receiving bearing bushes. Machining takes place in this process by means of a rotating and linearly displaceable drill rod that is guided through the pin bores and is received between a fixed centering point and a movable centering point, and an associated cutting tool. The movable centering point is in this case assigned to a rocker arm of an electronic shaping bolo head, via which the drill rod is movable so as to oscillate and/or be pivotable to a limited extent during the machining operation to create geometrically differently shaped bore profiles of the pin bores.

DE 10 2005 020 501 A1 describes a similar process for introducing a nonround pin bore into a piston of an internal combustion engine by means of a rotating and linearly displaceable drill rod. According to that approach, provision is made for the drill rod to be mounted between a fixed and a movable center and for the nonround form that is to be introduced to be scanned by means of a rocker lever and transmitted to the drill rod.

According to the process explained in DE 103 08 442 B3, by contrast, in order to produce a shaped bore by subtractive machining, a tool is driven by means of a magnetically mounted spindle that is drivable in rotation. The tool is mounted on that side of the workpiece that is remote from the spindle by a radially-magnetically mounted counter spindle. The radial position, the axial position and the angular position of the spindle are sensed by radial sensors, axial sensors and an angular position encoder and regulated to a programmable setpoint value via a regulating system. The workpiece and the tool are movable with respect to one another in the axial direction.

Finally, WO 2011/005498 A2 should also be acknowledged, said document proposing a further process for shaping pin holes and a corresponding drilling system. The process and device comprise in this case the fastening of a piston to a holder supported by a slide. Then, a cutting element rotates about a first axis and the slide, together with the holder, moves along the first axis in the direction of the cutting element and brings the piston into cutting contact with the cutting element. Furthermore, the holder moves along second and third axes which each extend transversely to the first axis, and the cutting element works the desired pin-hole contours into the piston.

SUMMARY

However, a disadvantage with these known approaches resides in the possible oscillation of the drilling tool carried by the tool spindle, this being a risk primarily when machining small and deep bores. To this extent, the deviation, carried out according to the prior art, of the tool spindle makes it difficult to use a sleeve that supports the tool and can be used without problems for additional support in the case of round bores. The invention is therefore based on the object of providing a tool spindle which prevents excessive oscillation of the drilling tool during operation. The invention furthermore has the object of creating a corresponding machine tool.

These objects are achieved by a tool spindle and a machine tool having the features of the claims.

The invention is accordingly based on the basic idea of modifying said deviation to such an extent that the drive shaft, together with the drilling tool received in the chuck, can be pivoted about a fixed point located centrally at the remote end of the drilling tool in the centering countersink thereof. In this way, the tool tip always remains in its original spatial position even when the drive shaft pivots, even though the orientation of the rotation axis can change noticeably with respect to the starting position.

The fixed point, thus formed in the end-side centering countersink, of the drilling tool now allows a sleeve that engages in this centering countersink and is oriented in the direction of the tool spindle to support the drilling tool with respect to the tool spindle and in this way to substantially stabilize it. The stabilizing effect can also be maintained in operation of the tool spindle when the latter is pivoted in the described manner, since the fixed point that serves as the attachment point of the sleeve cannot substantially change its position even in this application and undesired slipping of the sleeve out of the centering countersink can generally be avoided. Therefore, even the nonround or spherical shaping of small and deep bores is enabled by means of a tool spindle according to the invention, while the engagement of the sleeve is simultaneously able to prevent excessive oscillation of the tool.

The axial mounting of the drive shaft represents a particular challenge in this arrangement. To this extent, the fixed point that is at a considerable distance from the clamping shank requires a clear angular change on the part of the drive shaft in order to achieve the desired deviation in the region of the cutting edges of the drilling tool that are arranged between the corresponding end points. A conventional axial bearing reaches its geometric limits under certain circumstances given these dynamics and counteracts the desired pivoting movement to a considerable extent.

Against this background, the invention recognizes the essential significance of the shape of the axial mounting and in particular of the counterpart surface of the axial bearing on the part of the drive shaft. In a preferred embodiment, said counterpart surface is therefore formed by a ring that radially surrounds the axial bearing, a number of design variants being available for the geometric features of said ring.

First of all, a substantially planar embodiment of the ring comes into consideration. The corresponding tool spindle has the advantage of also supporting, in addition to the pivoting movement provided according to the invention, a mere translational movement of the drilling tool perpendicularly to the rotation axis thereof, as already corresponds to the prior art. In order, furthermore, to allow the tool spindle to pivot about the fixed point, it is expedient in this case and generally even necessary to provide an appropriate bearing clearance of the ring with regard to the axial bearing, in order to ensure sufficient freedom of movement thereof.

In a preferred embodiment, by contrast, the ring is not planar but bent in the direction of the fixed point. In order to realize a given pivot axis—extending through the fixed point perpendicularly to the common rotation axis of the drive shaft and drilling tool—it is appropriate in this case to shape the surface, serving for axial mounting, of the ring in such a way that it intersects the corresponding pivot plane in an imaginary circular arc about the fixed point.

However, inasmuch as several degrees of freedom of the pivoting movement are desired, the design of the ring surface in the form of a spherical cap, the center of which is formed once again by the characteristic fixed point of the arrangement, is recommended.

An oscillating pivoting movement of the drilling tool clamped in the tool spindle with a deviation of about 100 µm, which is particularly suitable for machining pistons, hubs, connecting rods or cams, has a large number of advantages here. Such an oscillating behavior can be brought about for example by a conventional controller, which to this end is connected electrically to the radial bearing embodied as an active magnetic bearing.

An embodiment as a magnetic bearing has considerable advantages even in the case of the axial bearing. The advantages of abrasion-free and thus dust-free rotary operation and also the reduced wear of the axial bearing with the consequence of reduced maintenance outlay are conceivable. Lubrication of the axial bearing can also be dispensed with in this approach, this in turn precluding the evaporation or chemical reaction of any lubricants. The low frictional losses furthermore allow the achievement of particularly high rotational-speed ranges on the part of the drive shaft. The positive consequences of the mechanical separation between the axial bearing and ring are supplemented by those of thermal and electrical insulation. Finally, when embodied as an active magnetic bearing, the axial bearing opens up the possibility of targeted damping of undesired oscillations and imbalance and also variable stiffness in operation of the tool spindle.

Alternatively, for example hydrostatic or aerostatic mounting of the drive shaft in the axial direction thereof is appropriate, this being distinguished, compared with the magnetic embodiment, by reduced structural complexity and a smaller space requirement and auxiliary power requirement while having a potentially increased force density.

Further important features and advantages of the invention can be gathered from the dependent claims, the drawings and the associated description of the figures with reference to the drawings.

It goes without saying that the features mentioned above and those yet to be explained below are usable not only in the combination specified in each case but also in other combinations or on their own without departing from the scope of the present invention.

Preferred exemplary embodiments of the invention are illustrated in the drawings and are explained in more detail in the following description, wherein identical reference signs refer to identical or similar or functionally identical components.

BRIEF DESCRIPTION OF THE DRAWINGS

In the drawings, in each case schematically

DETAILED DESCRIPTION

Figure 1:
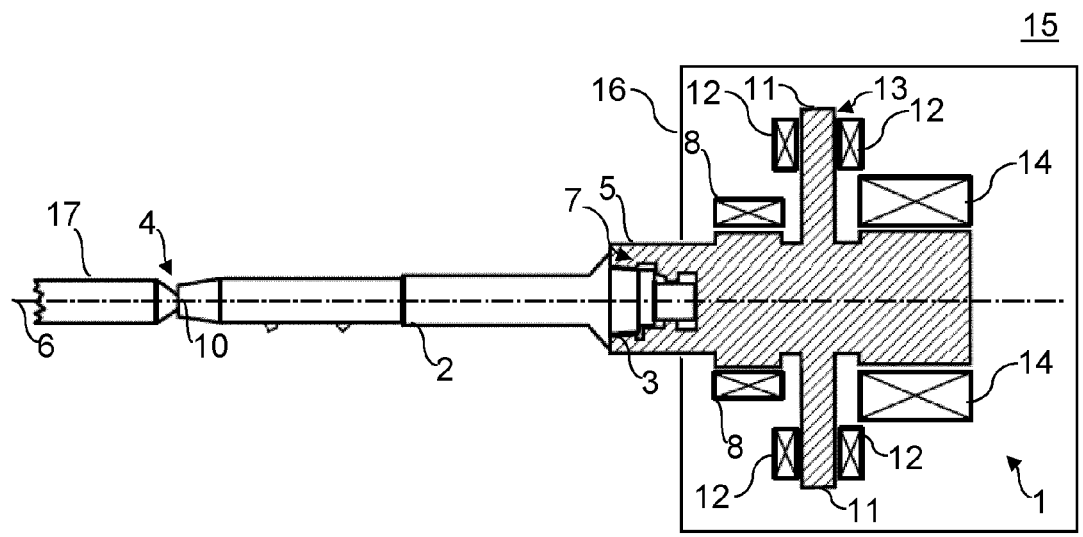
FIG. 1 shows the longitudinal section of a tool spindle according to a first embodiment.

FIG. 1 illustrates the basic structure of a comparatively simple machine tool 15, equipped with a drilling tool 2, according to a first embodiment of the invention. A drilling tool, drill or drill bit should be understood in this context as being in principle any tool which is suitable for producing bores in a workpiece by machining. The present drilling tool 2 in FIG. 1 is a drill rod which can be equipped with different cutting tools. A suitable hard metal can be used here for the material of the drilling tool 2.

A centering countersink 4 provided for centering the drilling tool 2 can be made out at the end of the elongate drilling tool 2 in FIG. 1, wherein, depending on the context, the term "centering countersink" can comprise very different for example conical or cylindrical bores or other depressions in the drilling tool 2, which allow the geometric engagement of a sleeve 17, tailstock or some other centering point of complementary shape in order to support said drilling tool 2.

In its end region located opposite the centering countersink 4 in the longitudinal direction of the drilling tool 2, the latter has a Morse-taper-shaped, cylindrical or hexagonal clamping shank 3, by means of which the drilling tool 2 is clamped in a tool spindle 1 according to the invention, carrying the drilling tool 2, of the machine tool 15. The machine tool 15 comprises, in addition to the abovementioned sleeve 17 and the tool spindle 1 arranged opposite the latter, a final receiving spindle housing 16 with an approximately rectangular outline, the tool spindle 1 projecting out of the central opening of said spindle housing 16 on a side facing the sleeve 17. In this region, the tool spindle 1 has a chuck 7, serving as a receptacle for the clamping shank 3 of the drilling tool 2, as part of a quick-release clamping device. Such a clamping device, which can be released or tightened manually quickly and typically without a special tool, is known to a person skilled in the art for example also as an HSK quick release.

In continuation of the provided rotation axis 6 of the drilling tool 2, said rotation axis 6 being substantially already defined by the orientation of the chuck 7, the main volume of the spindle housing 16 is traversed by a drive shaft 5 carrying the chuck 7, said drive shaft 5 for its part being connected mechanically to the rotor or stator of an electric motor 14 likewise received in the spindle housing 16 and being mounted so as to rotate about the rotation axis 6. Mounting in the radial direction takes place here by means of a radial bearing 8 that is embodied as an active magnetic bearing and encloses the drive shaft 5 in this direction on both sides within the spindle housing 16. This produces, with the aid of regulated electromagnets, a bearing force that acts radially on the drive shaft 5, wherein an electronic controller that is connected electrically to the radial bearing 8 and is not shown in the drawings, ensures the stability of the drive shaft 5 by way of feedback.

However, for mounting in the axial direction, use is made of a solid ring 11 that is formed integrally with the drive shaft 5 and radially encircles the drive shaft 5 between the radial bearing 8 and the electric motor 14 arranged on the end side of the drive shaft 5 opposite the chuck 7. This ring 11, which, in the first embodiment of the machine tool 15 according to FIG. 1, has substantially the form of a planar hollow cylinder with an outside diameter approximately twice as large as the drive shaft 5, is guided on both sides of its outer peripheral region by an axial bearing 12 perpendicular to the radial bearing 8, wherein the manufacturing tolerance of the ring 11 and axial bearing 12 allows a defined bearing clearance 13 between the interacting counterpart surfaces thereof.

Figure 2:
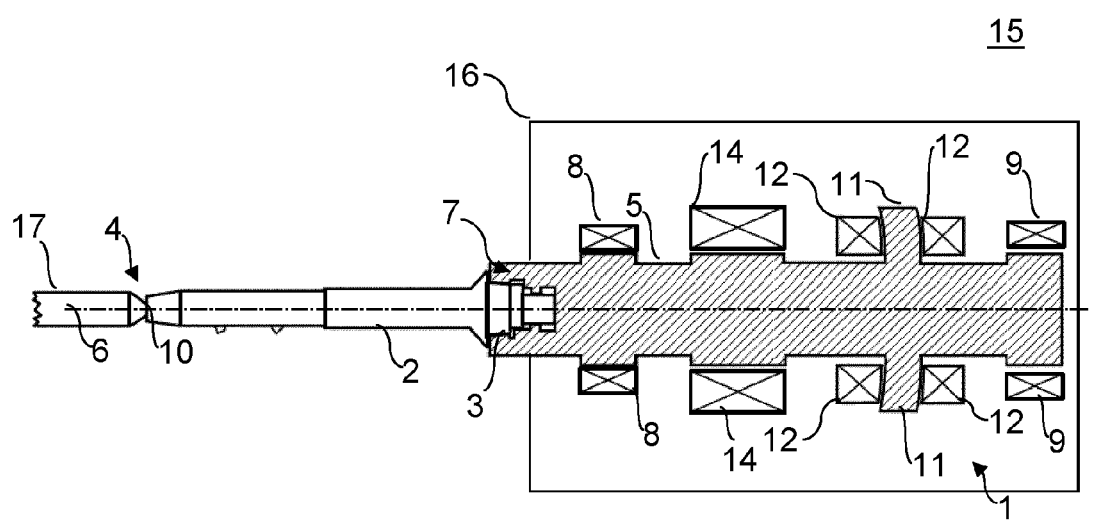
FIG. 2 shows the longitudinal section of a tool spindle according to a second embodiment.
Figure 3:
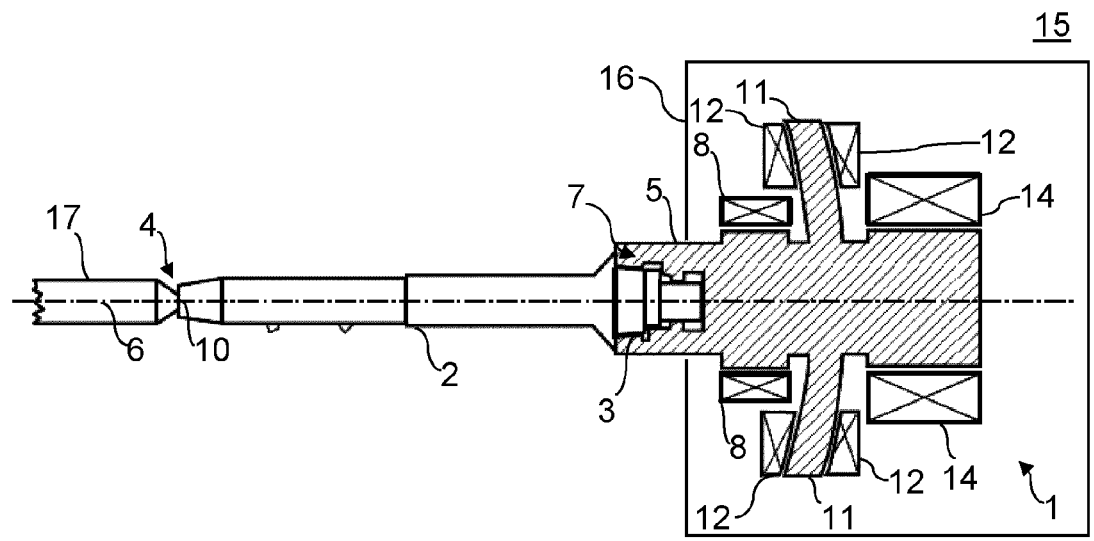
FIG. 3 shows the longitudinal section of a tool spindle according to a third embodiment.

The second and third embodiments of the machine tool 15 according to FIGS. 2 and 3 differ from this first embodiment according to FIG. 1 by way of the design of the tool spindle 1 and the form factor, resulting from the design thereof, of the spindle housing 16. To this extent, the tool spindle 1 shown in FIG. 2 comprises the second radial bearing 9 in an end region—remote from the chuck 7—of the drive shaft 5 that is formed in a correspondingly longer manner for this purpose, whereas, compared with the first embodiment, the electric motor 14 is now arranged in a central portion, located between the first radial bearing 8 and the ring 11, of the drive shaft 5.

A substantial difference of the embodiment according to FIG. 2 compared with that in FIG. 1, by contrast, resides in the shape of the ring 11 itself, the outside diameter of which is selected to be much smaller in this case. Thus, the ring 11 of the tool spindle 1 in FIG. 2 is clearly curved in the direction of a fixed point 10 in the centering countersink 4 of the drilling tool 2 and is separated from the axial bearing 12, enclosing it on both sides, merely by an air gap that is much thinner compared with the bearing clearance 13 in FIG. 1. In addition, the axial bearing 12 is also arranged much closer to the external circumference of the drive shaft 5 itself and thus is capable of setting a considerable axial bearing force against the mechanical spindle-sleeve force, exerted in the direction of the rotation axis 6 by the sleeve 17 engaging in the centering countersink 4, said spindle-sleeve force being transmitted via the drilling tool 2 to the drive shaft 5 and the ring 11 surrounding the latter. The size of said air gap remains substantially unchanged in this case as a result of the specific shaping of the ring 11 even in the case of a pivoting movement of the drive shaft 5 about a pivot axis extending perpendicularly to the rotation axis 6. Therefore, the axial bearing 12 can be embodied as an aerostatic bearing in the second embodiment of the machine tool 15 according to FIG. 2, without the constant volumetric flow rate of the air delivered for instance by means of suitable compressors between the ring 11 and axial bearing 12 being impaired.

Specifically, the surfaces, facing the axial bearing 12 on both sides of the ring 11, correspond to those of spherical caps—having radii that differ slightly from one another—about the described fixed point 10. Such a spatial geometry, which is distinguished by a substantially identical spacing between all points on the respective surfaces with respect to the central fixed point 10, is sometimes also described as a spherical calotte or spherical segment. For each pivot plane, comprising the rotation axis 6 and thus also the fixed point 10, of the drive shaft 5, this shaping of the ring 11 ensures that both surfaces intersect said spatial plane in a circular arc about the fixed point 10.

A similar design variant, although one that is characterized by a drive shaft 5 embodied in a shorter manner, is explained in FIG. 3 by way of a third embodiment of the machine tool 15 according to the invention. In this scenario, the ring 11 surrounding the drive shaft 5 of the tool spindle 1 again has a larger outside diameter comparable to FIG. 1, said outside diameter corresponding to an analogously enlarged opening angle of the spherical cap describing the ring 11. The second radial bearing 9 in FIG. 2 is dispensed with instead here, resulting again in the more compact design of FIG. 1 compared with FIG. 2.

Figure 4:
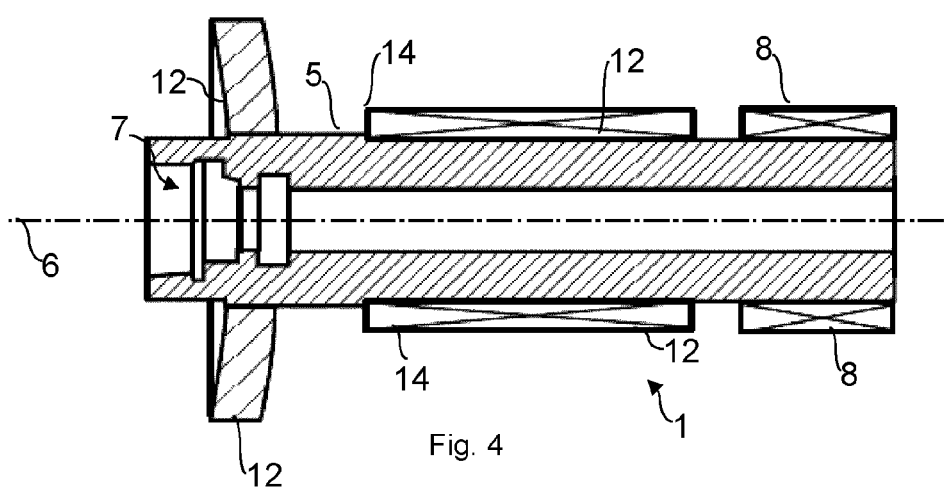
FIG. 4 shows the longitudinal section of tool spindle according to a fourth embodiment of the invention.

Finally, the embodiment, currently considered to be most advantageous, of a tool spindle 1 according to the invention will now be explained with reference to FIG. 4, which dispenses with reproducing a drilling tool—clamped in a manner corresponding to FIGS. 1 to 3—for a greater level of detail. Instead, the shaping of the drive shaft 5 in the form of a hollow shaft with an approximately uniform outside diameter is much clearer, wherein the thickness of the wall corresponds to approximately one third of this outside diameter. The tool spindle 1 in question, too, comprises only a single radial bearing 8, which in this case bears tightly against an axial end portion, remote from the chuck 7, of the drive shaft 5; this also goes for an electric motor 14 that is adjacent to the radial bearing 8 in the direction of the chuck 7 and extends along a much longer portion. The axial mounting—now arranged in a "front" region, comprising the chuck 7, of the drive shaft 5—once again proves to be characteristic in this embodiment, said axial mounting being dominated here by a noticeably strengthened axial bearing 12 attached at a sufficient axial distance from the electric motor 14.

The invention claimed is:

1. A tool spindle for an elongate drilling tool having an end-side clamping shank for clamping the drilling tool and a centering countersink, arranged opposite the clamping shank in a longitudinal direction, for centering the drilling tool, the tool spindle comprising;
    a drive shaft for driving the drilling tool,
    a chuck, connected rigidly to the drive shaft along a rotation axis directed longitudinally with respect to the drive shaft, for receiving the clamping shank,
    at least one radial bearing, radially enclosing at least a portion of the drive shaft, for radially mounting the drive shaft, configured such that the radial bearing mounts the drive shaft so as to be rotatable about the rotation axis,
    a ring that radially surrounds the drive shaft and is connected rigidly to the drive shaft, and
    an axial bearing, surrounding at least a portion of the ring, for axially mounting the drive shaft,
    wherein the radial bearing is an active magnetic bearing and is configured such that it mounts the drive shaft so as to be pivotable about at least one pivot axis extending perpendicularly to the rotation axis through a fixed point, wherein the fixed point is located in the centering countersink when the drilling tool is clamped in the tool spindle, and
    wherein the ring is bent in a direction toward the fixed point.

2. The tool spindle as claimed in claim 1, wherein the ring is substantially planar and has a predetermined bearing clearance with regard to the axial bearing.

3. The tool spindle as claimed in claim 1, wherein at least one surface of the ring intersects a pivot plane, extending perpendicularly to the pivot axis and including the fixed point, in a circular arc about the fixed point.

4. The tool spindle as claimed in claim 3, wherein the at least one surface is a spherical cap about the fixed point.

5. The tool spindle as claimed in claim 1, wherein the axial bearing is a magnetic, hydrostatic or aerostatic bearing.

6. The tool spindle as claimed in claim 5, wherein the axial bearing is one of a hydrostatic or an aerostatic bearing.

7. The tool spindle as claimed in claim 1, further comprising a controller, connected electrically to the radial bearing, for controlling the tool spindle, configured such that the radial bearing is able to set the drilling tool, via the drive shaft, into oscillation with a deviation of approximately 100 μm when the drilling tool is clamped in the tool spindle and the tool spindle is in operation.

8. The tool spindle as claimed in claim 1, further comprising an electric motor, connected mechanically to the drive shaft, for rotating the tool spindle.

9. The tool spindle as claimed in claim 1, wherein the drive shaft is produced by at least one of a sintering process and a subtractive finishing process.

10. The tool spindle as claimed in claim 9, wherein the sintering process uses a sintered material that is hardenable and has at least a TiCa content of 22% by weight.

11. A machine tool comprising:
    a tool spindle for carrying a drilling tool, the tool spindle having:
        a drive shaft for driving the drilling tool,
        a chuck, connected rigidly to the drive shaft along a rotation axis directed longitudinally with respect to the drive shaft, for receiving a clamping shank of the drilling tool,
        at least one radial bearing, radially enclosing at least a portion of the drive shaft, for radially mounting the drive shaft, configured such that the radial bearing mounts the drive shaft so as to be rotatable about the rotation axis,
        a ring that radially surrounds the drive shaft and is connected rigidly to the drive shaft, and
        an axial bearing, surrounding at least a portion of the ring, for axially mounting the drive shaft,
    a spindle housing, enclosing the tool spindle at least regionally, for receiving the tool spindle, and
    a sleeve, oriented outside the spindle housing in the direction of the tool spindle, for supporting the drilling tool with respect to the tool spindle, formed such that the sleeve can engage in an end-side centering countersink of the drilling tool,
    wherein the radial bearing is an active magnetic bearing and is configured such that it mounts the drive shaft so as to be pivotable about at least one pivot axis extending perpendicularly to the rotation axis through a fixed point, wherein the fixed point is located in a centering countersink of the drilling tool when the drilling tool is clamped in the tool spindle,
    wherein the axial bearing is located radially outward of the at least one radial bearing.

12. The machine tool as claimed in claim 11, wherein the ring is substantially planar and has a predetermined bearing clearance with regard to the axial bearing.

13. The tool spindle as claimed in claim 11, wherein at least one surface of the ring intersects a pivot plane, extending perpendicularly to the pivot axis and including the fixed point, in a circular arc about the fixed point.

14. The machine tool as claimed in claim 11, wherein the axial bearing is a magnetic, hydrostatic or aerostatic bearing.

15. The machine tool as claimed in claim 11, further comprising a controller, connected electrically to the radial bearing, and configured to control the tool spindle such that the radial bearing is able to set the drilling too, via the drive shaft, into oscillation with a deviation of approximately 100 μm when the drilling tool is clamped in the tool spindle and the tool spindle is in operation.

16. The machine tool as claimed in claim 11, further comprising an electric motor, connected mechanically to the drive shaft, and configured to rotate the tool spindle.

17. A tool spindle for an elongate drilling tool having an end-side clamping shank for clamping the drilling tool and a centering countersink, arranged opposite the clamping shank in a longitudinal direction, for centering the drilling tool, the tool spindle comprising:
    a drive shaft for driving the drilling tool,
    a chuck, connected rigidly to the drive shaft along a rotation axis directed longitudinally with respect to the drive shaft, for receiving the clamping shank,
    at least one radial bearing, radially enclosing at least a portion of the drive shaft, for radially mounting the drive shaft, configured such that the radial bearing mounts the drive shaft so as to be rotatable about the rotation axis,
    a ring that radially surrounds the drive shaft and is connected rigidly to the drive shaft, and
    an axial bearing, surrounding at least a portion of the ring, for axially mounting the drive shaft, wherein the radial bearing is an active magnetic bearing and is configured such that it mounts the drive shaft so as to be pivotable about at least one pivot axis extending perpendicularly to the rotation axis through a fixed point, wherein the fixed point is located in the centering countersink when the drilling tool is clamped in the tool spindle, wherein the axial bearing is a magnetic, hydrostatic or an aerostatic bearing wherein the ring is bent in a direction toward the fixed point, and wherein the axial bearing is located radially outward of the at least one radial bearing.

\* \* \* \* \*